(12) United States Patent  
Imai (10) Patent No.: US 9,309,043 B2  
(45) Date of Patent: Apr. 12, 2016

(54) OPTICAL ELEMENT STORAGE PACKAGE, OPTICAL FILTER DEVICE, OPTICAL MODULE, AND ELECTRONIC APPARATUS

(71) Applicant: Seiko Epson Corporation, Tokyo (JP)

(72) Inventor: Hideo Imai, Shimosuwa-machi (JP)

(73) Assignee: Seiko Epson Corporation (JP)

( * ) Notice: Subject to any disclaimer, the term of this patent is extended or adjusted under 35 U.S.C. 154(b) by 223 days.

(21) Appl. No.: 14/054,917

(22) Filed: Oct. 16, 2013

(65) Prior Publication Data

US 2014/0102922 A1 Apr. 17, 2014

(30) Foreign Application Priority Data

Oct. 17, 2012 (JP) ................... 2012-229588

(51) Int. Cl.
*B60R 1/06* (2006.01)
*G02B 5/124* (2006.01)
*G02B 7/00* (2006.01)
*B65D 85/38* (2006.01)

(52) U.S. Cl.
CPC ........... *B65D 85/38* (2013.01); *G02B 7/00* (2013.01); *G02B 7/006* (2013.01)

(58) Field of Classification Search
CPC ....... G02B 27/0006; G02B 1/105; G02B 7/00; G02B 23/16

USPC .................. 359/507, 513, 514, 894
See application file for complete search history.

(56) References Cited

U.S. PATENT DOCUMENTS

| 6,226,133 B1 * | 5/2001 | Osakabe ................ 359/811 |
| 2007/0007360 A1 | 1/2007 | Ogino et al. |
| 2008/0079846 A1 * | 4/2008 | Ikari ..................... 348/373 |
| 2013/0075596 A1 | 3/2013 | Matsuno et al. |

FOREIGN PATENT DOCUMENTS

| JP | 2005-079146 A | 3/2005 |
| JP | 4648780 | 12/2010 |
| JP | 2013-072981 A | 4/2013 |

* cited by examiner

*Primary Examiner* — Jade R Chwasz
(74) *Attorney, Agent, or Firm* — Harness, Dickey & Pierce, P.L.C.

(57) ABSTRACT

An optical element storage package, an optical filter device, an optical module, and an electronic apparatus are disclosed. The optical element storage package is an optical element storage package having a cavity that accommodates an optical element. The optical element storage package includes a case member that forms the cavity, an enclosure member that is part of the case member and has an opening through which the cavity is open, a first window member that covers the opening from outside the cavity and is bonded to the enclosure member, through which the opening is formed, and a second window member that covers the opening from inside the cavity and is bonded to the enclosure member.

19 Claims, 5 Drawing Sheets

OPTICAL ELEMENT STORAGE PACKAGE, OPTICAL FILTER DEVICE, OPTICAL MODULE, AND ELECTRONIC APPARATUS

BACKGROUND

1. Technical Field

The present invention relates to an optical element storage package, an optical filter device, an optical module, and an electronic apparatus.

2. Related Art

As known optical elements of related art, there are, for example, imaging devices using CCD (charge coupled device) and COMS (complementary metal oxide semiconductor) technologies, a DMD (digital mirror device) and other display devices, and an etalon filter and other optical filters. Any of the optical elements described above is typically accommodated in a storage container (optical element storage package) sealed with a lid unit including a light transmissive portion in order to protect the optical element from externally applied mechanical impact, prevent external moisture from entering, and achieve satisfactory element characteristics under a reduced pressure environment.

Since any of the optical elements described above is incorporated in a variety of electronic apparatus used under a variety of environments, the storage container that accommodates the optical element is required to be compact, lightweight, highly reliable, and highly environmentally resistant. For example, JP-A-2005-79146 proposes a technology for achieving sealing with satisfactory airtight reliability based on a metal frame and a window member that forma lid unit by skillfully shaping a portion where the metal frame and the window portion are bonded to each other to prevent the window member from being broken, a low-melting glass material that forms the bonded portion from being fractured, or the metal frame and the window member from separating from each other even when large thermal stress is produced between the metal frame and the window member.

The storage container described in JP-A-2005-79146 is, however, problematic in that when greater thermal stress is produced, for example, when the coefficients of thermal expansion of the metal frame and the window member greatly differ from each other, the low-melting glass material of the bonded portion is fractured. Further, even when the low-melting glass material is not fractured, the thermal stress undesirably deforms the lid unit, or thermal impact repeatedly deforms the lid unit to cause the metal frame and the window member to undesirably separate from each other.

SUMMARY

An advantage of some aspects of the invention is to solve at least a part of the problems described above and the invention can be implemented as the following forms or application examples.

Application Example 1

This application example is directed to an optical element storage package having a cavity that accommodates an optical element and including a case member that forms the cavity, an enclosure member that is part of the case member and has an opening through which the cavity is open, a first window member that covers the opening from outside the cavity and is bonded to the enclosure member, through which the opening is formed, and a second window member that covers the opening from inside the cavity and is bonded to the enclosure member.

According to this application example, the opening, which is provided in the enclosure member and through which the cavity is open, is covered with the first window member and the second window member bonded to the enclosure member, through which the opening is formed. In other words, at the opening, the first window member and the second window member are so bonded to the enclosure member that the window members sandwich the enclosure member. The configuration described above suppresses deformation of the enclosure member even when the material of the enclosure member and the material of the window members (first window member and second window member) differ from each other in terms of coefficient of thermal expansion and hence thermal stress is produced, because the window members so bonded to the front and rear sides of the enclosure member that the window members sandwich the enclosure member allow thermal stress produced on the front side and thermal stress produced on the rear side to be balanced with each other. When the deformation of the enclosure member is suppressed, stress produced in the portions where the enclosure member and the window members are bonded to each other is reduced, whereby separation in the bonded portions will not occur. As a result, an optical element storage package capable of more satisfactorily maintaining internal airtightness can be provided.

Application Example 2

This application example is directed to the optical element storage package according to the application example described above, wherein T1>T2 is satisfied, where T1 is an average thickness of the enclosure member, and T2 is the distance between a surface where the enclosure member and the first window member are bonded to each other and a surface where the enclosure member and the second window member are bonded to each other.

According to this application example, the thickness T2 of the portion of the enclosure member that is sandwiched between the first window member and the second window member is thinner than the average thickness T1 of the enclosure member. As a result, even when thermal stress is produced due to the difference in coefficient of thermal expansion between the material of the enclosure member and the material of the window members (first window member and second window member), the window members bonded to the front and rear sides of the enclosure member more readily allow the thermal stress on the front side and the thermal stress on the rear side to be balanced with each other. That is, since the first and second window members are bonded to a thinner portion of the enclosure than the other portions thereof, the effect of the thermal stress applied from the enclosure member to the window members can be reduced. As a result, stress produced in the portions where the enclosure member and the window members are bonded to each other is reduced by a greater amount, whereby separation in the bonded portions is further suppressed.

Further, since the first and second window members sandwich and overlap with the thin region of the enclosure member, a thinner optical element storage package can be provided.

Application Example 3

This application example is directed to the optical element storage package according to the application examples described above, wherein the second window member is made of a material of which the first window member is made.

Forming the first window member and the second window member with the same material as in this application example allows thermal stress on the front side of the enclosure member and thermal stress on the rear side thereof can be balanced in a more satisfactory manner because the coefficients of thermal expansion of the window members that sandwich the front and rear sides of the enclosure member are equal to each other.

Application Example 4

This application example is directed to the optical element storage package according to the application example described above, wherein the cavity is sealed by the case member and the first window member in an airtight manner, and P1>P2 is satisfied, where P1 is the atmospheric pressure, and P2 is the pressure in the cavity.

According to this application example, in the step of accommodating an optical element in the cavity, the optical element is accommodated in the cavity maintained in a reduced pressure state and the cavity is sealed in an airtight manner. A package device in which the optical element functions in the reduced pressure environment can thus be provided. As a result, the optical element can have better characteristics, for example, when the optical element includes a MEMS structure or any other movable portion or when gases in the cavity affect the light received by the optical element.

Application Example 5

This application example is directed to the optical element storage package according to the application example described above, wherein an air compartment formed by the enclosure member and the first and second window members bonded to the enclosure member is sealed in an airtight manner, and P2>P3 or P2=P3 is satisfied, where P3 is the pressure in the air compartment.

According to this application example, the pressure P3 in the air compartment surrounded by the enclosure member and the first and second window members is lower than the atmospheric pressure P1 and the pressure P2 in the cavity or lower than the atmospheric pressure P1 but equal to the pressure P2 in the cavity. The differences in pressure therefore cause the first window member to receive a pressure in the direction in which the first window member is pressed against the enclosure member. Further, the second window member at least does not receive a force in the direction in which the second window member is separated from the enclosure member. As a result, each of the first window member and the second window member is more unlikely to be separated from the enclosure member.

Application Example 6

This application example is directed to the optical element storage package according to the application example described above, wherein a communication hole that allows an air compartment formed by the enclosure member and the first and second window members bonded to the enclosure member to communicate with the cavity is provided.

According to this application example, since a communication hole that allow the air compartment, which is formed by the enclosure member and the first and second window members bonded to the enclosure member, to communicate with the cavity is provided, the pressure in the air compartment and the pressure in the cavity are maintained at the same pressure. As a result, the second window member will receive no pressure in the direction in which the second window member is separated because there is no difference in pressure between the air compartment and the cavity, whereby separation of the second window member is unlikely even when the pressure in the cavity is reduced.

Application Example 7

This application example is directed to the optical element storage package according to the application example described above, wherein the enclosure member is made of a metal material, and each of the first window member and the second window member is made of a light transmissive material.

According to this application example, since the enclosure member is made of a metal material and each of the first and second window members is made of a light transmissive material, light can be selectively introduced to the optical element accommodated therein. Specifically, light traveling along a predetermined optical path can be selectively introduced to the optical element through the light transmissive material, whereas the metal material that forms the enclosure member, for example, blocks undesired light.

Further, even when the metal material and the light transmissive material have coefficients of thermal expansion different from each other, the package according to this application example can reduce the effect of thermal stress produced by the difference in coefficient of thermal expansion, whereby the amount of stress produced in the portions where the enclosure member and the window members are bonded to each other is reduced and hence separation of the bonded portions is suppressed. As a result, an optical element storage package capable of satisfactorily maintaining internal airtightness can be provided.

Application Example 8

This application example is directed to an optical filter device including an optical filter accommodated in the optical element storage package described above.

According to this application example, since the optical filter is accommodated in the optical element storage package capable of more satisfactorily maintaining internal airtightness even when thermal stress acts thereon, an optical filter device that is more reliable and has higher environmental resistance can be provided.

Application Example 9

This application example is directed to an optical module including an optical element accommodated in the optical element storage package described above.

According to this application example, since the optical element is accommodated in the optical element storage package capable of more satisfactorily maintaining internal airtightness even when thermal stress acts thereon, an optical module that is more reliable and has higher environmental resistance can be provided.

Application Example 10

This application example is directed to an electronic apparatus including an optical element accommodated in the optical element storage package described above.

According to this application example, since the optical element in the electronic apparatus is accommodated in the optical element storage package capable of more satisfactorily maintaining internal airtightness even when thermal stress acts thereon, an electronic apparatus that is more reliable and has higher environmental resistance can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments in which the invention is embodied will be described below with reference to the drawings. The following description is presented as embodiments of the invention and does not limit the invention. The following figures are not drawn to scale in some cases for ease of description.

First Embodiment

A description will first be made of an optical element storage package 100 and an optical filter device 200 according to a first embodiment.

Figure 1A:
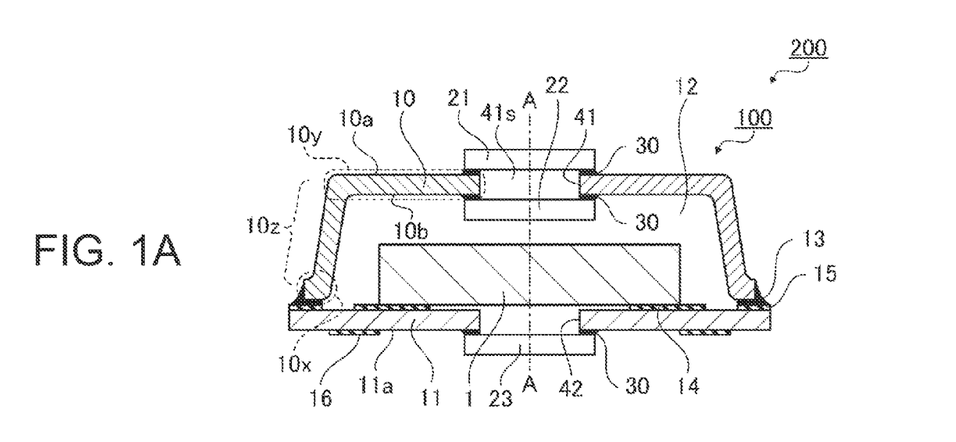
FIG. 1A is a cross-sectional view showing an optical element storage package and an optical filter device according to a first embodiment.

FIG. 1A is a cross-sectional view showing the optical filter device 200 in which the optical element storage package 100 accommodates an etalon filter, as an example of an optical filter device.

The optical filter device 200, which is a unit that extracts light of a predetermined target wavelength from incident light, includes the etalon filter (hereinafter referred to as etalon 1) as an optical element and the optical element storage package 100, which accommodates the etalon 1. The thus configured optical filter device 200 can be incorporated, for example, in a colorimetric sensor and other optical modules and a colorimetric unit, a gas analysis unit, and other electronic apparatus. The configuration of an optical module and an electronic apparatus including the optical filter device 200 will be described later in a third embodiment, which will be described later.

The etalon 1 is not only a wavelength tunable interference filter (optical element with parallel surfaces used to increase the coherent length of a laser) but also an optical element having a rectangular plate shape. No description of the etalon 1 will be made.

The optical element storage package 100 is formed, for example, of a lid 10 as an enclosure member, a base substrate 11, a light transmissive substrate 21 as a first window member bonded to the lid 10, a light transmissive substrate 22 as a second window member bonded to the lid 10, a light transmissive substrate 23 bonded to the base substrate 11, bonding members 13 and 30, and a bonding pattern 15.

Each of the lid 10, the base substrate 11, the bonding members 13 and 30, and the bonding pattern 15 is a case member, and the case members form a cavity 12, in which the etalon 1 is accommodated.

The optical element storage package 100 in this embodiment, which accommodates an etalon filter as an example of the optical element, does not necessarily accommodate an etalon filter but may accommodate any other optical element.

The lid 10 includes a lid bonding portion 10x, which is bonded to the periphery of the base substrate 11, a sidewall portion 10z, which is an extension of the lid bonding portion 10x and extends upward in a direction away from the base substrate 11, and a top surface portion 10y, which is an extension of the sidewall portion 10z and covers the etalon 1, as shown in FIG. 1A.

The lid 10 can be made, for example, of kovar, 42 alloy, aluminum, copper, duralumin, or any other suitable metal or an alloy containing any of the materials described above and is intimately bonded to the base substrate 11 with the lid bonding portion 10x bonded to the periphery of the base substrate 11 via the bonding member 13. Examples of a bonding method may include laser welding, soldering using silver solder or any other material, sealing using a eutectic alloy layer, welding using low-melting glass, glass sealing, glass frit bonding, and adhesive bonding using an epoxy resin. One of the bonding methods described above can be selected as appropriate in consideration of the materials of the base substrate 11 and the lid 10, a bonding environment, and other factors.

In this embodiment, the bonding pattern 15, which is made, for example, of Ni or Au, is formed on the periphery of the base substrate 11, and the bonding pattern 15 and the lid bonding portion 10x are irradiated with high-power laser light (YAG laser light, for example) for laser bonding.

The top surface portion 10y of the lid 10 is substantially parallel to the base substrate 11. A circular opening 41, through which light passes, is formed in the top surface portion 10y in a region facing the etalon 1. In this embodiment, the shape of the opening 41 is circular, but not necessarily, and may be triangular, rectangular, polygonal, or a combination thereof.

The base substrate 11 is a flat plate formed, for example, of a single-layer ceramic substrate. The etalon 1 is mounted on the base substrate 11. The etalon 1 is fixed to the base substrate 11, for example, via an adhesive. The etalon 1 is not necessarily fixed via an adhesive but may, for example, be fit into another fixing member or sandwiched by other fixing members and then fixed to the base substrate 11.

A conductive pattern 14, which is connected to an electric connection surface of the etalon 1, is provided on the side of the base substrate 11 on which the etalon 1 is mounted. Although specific connection between the electric connection surface of the etalon 1 and the conductive pattern 14 is not shown, the connection can be made based, for example, on FPC (flexible printed circuits) using an Ag paste, an ACF (anisotropic conductive film), an ACP (anisotropic conductive paste), or any other suitable material. It is preferable to use an Ag paste, which emits a smaller amount of gas than the others, in order to maintain a reduced pressure state in the cavity 12. The connection is not necessarily made based on FPC and may be made based on wire bonding or any other wiring connection.

A circular opening 42, through which light passes, is formed in the base substrate 11 in a region facing the etalon 1. In this embodiment, the shape of the opening 42 is circular, but not necessarily, and may be triangular, rectangular, polygonal, or a combination thereof.

An external connection terminal 16 is formed on the outer surface of the base substrate 11 (surface facing away from surface on which etalon 1 is mounted). The conductive pattern 14 and the external connection terminal 16 are connected to each other via a wiring pattern formed in the base substrate 11.

The light transmissive substrate 21 is a glass substrate that covers the opening 41 from outside the cavity 12 and is bonded to an outer wall surface 10a of the top surface portion 10y, through which the opening 41 is formed.

The light transmissive substrate 22 is a glass substrate that covers the opening 41 from inside the cavity 12 and is bonded to an inner wall surface 10b of the top surface portion 10y, through which the opening 41 is formed.

The light transmissive substrate 23 is a glass substrate that covers the opening 42 from outside the cavity 12 and is bonded to an outer wall surface 11a of the base substrate 11, through which the opening 42 is formed.

The light transmissive substrates 21 and 22 are sized to be greater than the opening 41, and the light transmissive substrate 23 is sized to be greater than the opening 42.

The centers of the light transmissive substrates 21, 22, and 23 coincide with the centers of the openings 41, 42 and the etalon 1 in a plan view and are present along a straight line A-A perpendicular to the base substrate 11. The glass substrates that form the light transmissive substrates 21, 22, and 23 are made of the same material.

In the configuration described above, light is incident through the opening 41 of the lid 10, and light of a desired target wavelength extracted by the etalon 1 exits through the opening 42 of the base substrate 11.

Each of the light transmissive substrates 21 to 23 is not necessarily formed of a glass substrate and may be formed, for example, of a quartz, silicon, or germanium substrate depending on the wavelength of the light intended to pass through the substrate.

The bonding between the lid 10 and the light transmissive substrates 21, 22 and between the base substrate 11 and the light transmissive substrate 23 is made via the bonding members 30. The bonding members 30 can be made, for example, of glass frit, which is formed of glass pieces produced by melting a glass raw material at high temperature and quenching the molten glass material. Bonding performed by burning glass frit (glass frit bonding), in which the bonded portion is seamlessly formed, and using glass frit that emits a small amount of gas allow the cavity 12 to be maintained in a reduced pressure state. It is noted that welding using low-melting glass or glass sealing may be used instead of the glass frit bonding.

Figure 1B:
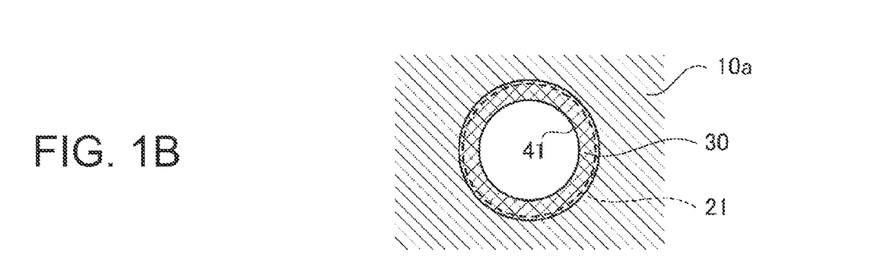
FIG. 1B is a plan view showing a bonded portion around an opening viewed from the side where an outer wall surface is present.
Figure 1C:
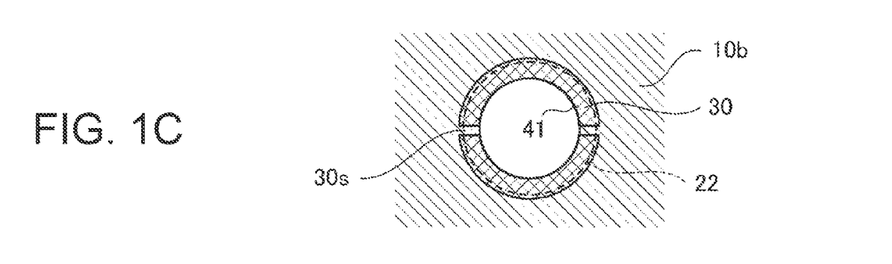
FIG. 1C is a plan view showing the bonded portion around the opening viewed from the side where an inner wall surface is present.

FIG. 1B is a plan view showing the bonded portion around the opening 41 viewed from the side where the outer wall surface 10a is present, and FIG. 1C is a plan view showing the bonded portion around the opening 41 viewed from the side where the inner wall surface 10b is present. The light transmissive substrates 21 and 22 are drawn with broken lines for ease of illustration.

The lid 10 and the light transmissive substrate 21 are bonded to each other and sealed in an airtight manner via the seamlessly disposed bonding member 30, as shown in FIG. 1B. Although not shown, the base substrate 11 and the light transmissive substrate 23 are similarly bonded to each other and sealed in an airtight manner.

The storage of the etalon 1 and the airtight sealing of the components described above are performed under a predetermined reduced pressure environment. The pressure in the cavity 12 is therefore maintained at a pressure lower than the atmospheric pressure.

The lid 10 and the light transmissive substrate 22 are bonded to each other with gaps 30s provided in the region where the bonding member 30 is disposed, as shown in FIG. 1C. The gaps allow a space 41s, which is formed by the lid 10 and the light transmissive substrates 21 and 22 bonded to the lid 10, to communicate with the cavity 12. The pressure in the space 41s is therefore equal to the reduced pressure in the cavity 12.

The positions and number of gaps 30s are not limited to those shown in FIG. 1C but the sizes and numbers are preferably minimized because the lid 10 and the light transmissive substrate 22 need to be bonded to each other with sufficient bonding strength.

Figure 2A:
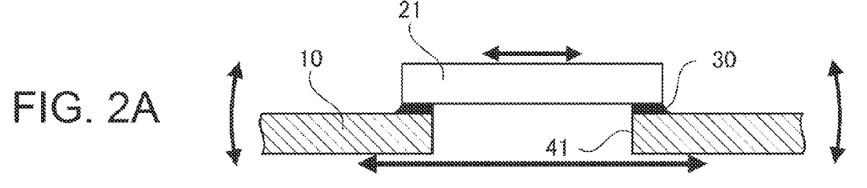
FIGS. 2A and 2B are descriptive cross-sectional views for comparing a method for attaching window members (light transmissive substrates) to cover the opening with an attaching method in related art.
Figure 2B:
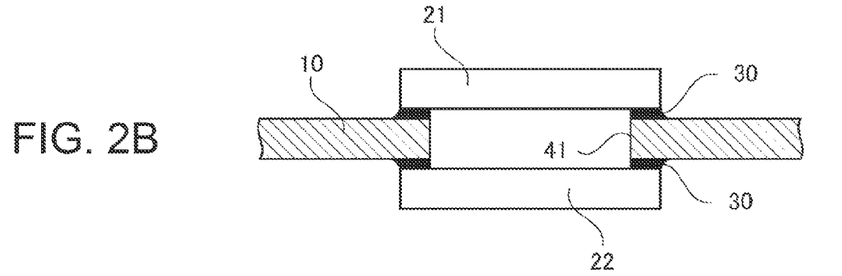

FIGS. 2A and 2B are descriptive cross-sectional views for comparing a method for attaching the window members (light transmissive substrates) to cover the opening 41 with an attaching method in related art.

In related art, in general, only the light transmissive substrate 21 is bonded to the outer wall surface 10a of the top surface portion 10y, as shown in FIG. 2A.

The lid 10 is generally required to be, for example, rigid, opaque, thermally resistant, moisture resistant, and airtight as a package enclosure. To this end, the lid 10 is made of a metal as described above in many cases. On the other hand, the light transmissive substrates as the window members are required to be made of a material that transmits light of interest as well as being rigid, thermally resistant, moisture resistant, and airtight. To this end, glass, quartz, silicon, germanium, or any other suitable material is used as described above. As a result, the coefficients of thermal expansion of the materials of the lid and the light transmissive substrates greatly differ from each other in many cases. For example, a kovar material of which the lid 10 is made has a coefficient of thermal expansion of 5.1 ppm/° C., whereas a glass material (borosilicate glass) of which the light transmissive substrates 21 to 23 are made is 7.2 ppm/° C.

An optical filter device is used in a variety of temperature environments, such as under thermal stress produced by a light source. Using the method in related art therefore causes thermal stress due to the difference in coefficient of thermal expansion to act on the portion where the light transmissive substrate 21 is bonded to the portion around the opening 41, undesirably resulting in bending of the lid 10, as in a case where a bimetal bends, or cracks in the bonded portion or breakage thereof due to repeated bending resulting from a temperature cycle in the environment where the device is used.

In contrast, in this embodiment, the light transmissive substrates 21 and 22 are so bonded to the front and rear sides of the opening 41 that the light transmissive substrates 21 and 22 sandwich the lid 10, as shown in FIG. 2B.

As a result, although thermal stress due to the difference in coefficient of thermal expansion is still produced, the deformation of the lid 10 can be suppressed because the substrates having the same coefficient of thermal expansion sandwich the lid 10 from above and below.

As described above, the optical element storage package 100 according to this embodiment can provide the following advantageous effects.

The opening 41, which is provided in the lid 10 and through which the cavity 12 is open, is covered with the light transmissive substrate 21 bonded to the outer side of the opening 41 and the light transmissive substrate 22 bonded to the inner side of the opening 41. In other words, at the opening 41, the light transmissive substrate 21 and the light transmissive substrate 22 are so bonded to the lid 10 that the substrates sandwich the lid 10. The configuration described above suppresses deformation of the lid 10 even when the material of the lid 10 and the material of the window members (light transmissive substrates 21 and 22) differ from each other in terms of coefficient of thermal expansion and hence thermal stress is produced, because the window members so bonded to the front and rear sides of the lid 10 that the window members sandwich the lid 10 allow thermal stress produced on the front side and thermal stress produced on the rear side to be balanced with each other. When the deformation of the lid 10 is suppressed, the stress produced in the portions where the lid 10 and the window members are bonded to each other is reduced, whereby cracks in the bonded portions or separation in the bonded portions will not occur. As a result, an optical element storage package capable of more satisfactorily maintaining internal airtightness can be provided.

Further, this embodiment newly provides an opportunity for materials that has not been used as bonding substrates due, for example, to deformation resulting from the difference in coefficient of thermal expansion to be used because this embodiment suppresses the deformation.

Moreover, in the step of accommodating an optical element, such as the etalon 1, in the cavity 12, the optical element is accommodated in the cavity 12 maintained in a reduced pressure state and the cavity 12 is sealed in an airtight manner. A package device in which the optical element functions in the reduced pressure environment can thus be provided. As a result, the optical element can have better characteristics, for example, when the optical element includes a MEMS structure or any other movable portion or when gases in the cavity 12 affect the light received by the optical element.

Further, since communication holes (gaps 30s) that allow the space 41s, which is formed by the lid 10 and the light transmissive substrates 21 and 22 bonded to the lid 10, to communicate with the cavity 12 is provided, the pressure in the space 41s and the pressure in the cavity 12 are maintained at the same pressure. As a result, the light transmissive substrate 22 will receive no pressure in the direction in which the light transmissive substrate 22 is separated because there is no difference in pressure between the space 41s and the cavity 12, whereby separation of the light transmissive substrate 22 is unlikely even when the pressure in the cavity 12 is reduced.

Moreover, since the lid 10 is made of a metal material and the light transmissive substrates 21 and 22 are made of a light transmissive material, light can be selectively introduced to the optical element accommodated in the cavity. Specifically, light traveling along a predetermined optical path can be selectively introduced to the optical element through the light transmissive material, whereas the metal material that forms the lid 10, for example, blocks undesired light.

Further, according to the optical filter device 200 of this embodiment, since the etalon 1 is accommodated in the optical element storage package 100 capable of more satisfactorily maintaining the internal airtightness even when thermal stress acts on the package, an optical filter device having higher reliability and environmental resistance can be provided.

Second Embodiment

An optical element storage package 101 according to a second embodiment will next be described. In the description, the same components as those in the embodiment described above have the same reference characters, and no redundant description will be made.

Figure 3:
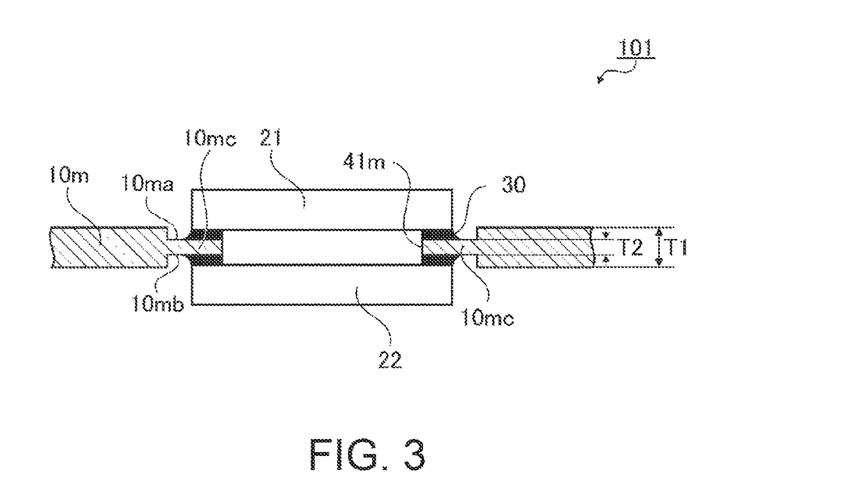
FIG. 3 is a cross-sectional view showing an opening formed through a top surface portion of an optical element storage package according to a second embodiment and portions around the opening.

FIG. 3 is a cross-sectional view showing an opening formed through a top surface portion of the optical element storage package 101 and portions around the opening.

The optical element storage package 101 is characterized in that an opening portion sandwiched between the light transmissive substrate 21 and the light transmissive substrate 22 forms a thin lid member.

The optical element storage package 101 is formed, for example, of a lid 10m as the enclosure member, the base substrate 11, the light transmissive substrate 21 as the first window member bonded to the lid 10m, the light transmissive substrate 22 as the second window member bonded to the lid 10m, the light transmissive substrate 23 bonded to the base substrate 11, the bonding members 13 and 30, and the bonding pattern 15 (refer to FIG. 1A for base substrate 11, light transmissive substrate 23, bonding member 13, and bonding pattern 15).

The lid 10m has a thin region 10mc having a portion to which the light transmissive substrate 21 and the light transmissive substrate 22 are bonded, as shown in FIG. 3. Now, let T1 be the average thickness of the lid 10m and T2 be the thickness of the region 10mc (the distance between a surface 10ma where the light transmissive substrate 21 is bonded to the lid 10m and a surface 10mb where the light transmissive substrate 22 is bonded to the lid 10m). The region 10mc is so formed that T1>T2 is satisfied. Except this point, the optical element storage package 101 is the same as the optical element storage package 100.

The optical element storage package according to this embodiment can provide the following advantageous effects in addition to those provided in the embodiment described above.

The thickness T2 of the region 10mc is thinner than the average thickness T1 of the lid 10m. As a result, even when thermal stress is produced due to the difference in coefficient of thermal expansion between the material of the lid 10m and the material of the window members (light transmissive substrates 21 and 22), the window members bonded to the front and rear sides of the lid 10m more readily allow the thermal stress on the front side and the thermal stress on the rear side to be balanced with each other. That is, since the light transmissive substrates 21 and 22 are bonded to a thinner portion of the lid 10m than the other portions thereof, the effect of the thermal stress applied from the lid 10m to the light transmissive substrates 21 and 22 can be reduced. As a result, the stress produced in each of the portions where the lid 10m, the light transmissive substrate 21, and the light transmissive substrate 22 are bonded to each other is reduced by a greater amount, whereby occurrence of cracks in the bonded portions or separation in the bonded portions is further suppressed.

Further, since the light transmissive substrates 21 and 22 sandwich and overlap with the thin region of the lid 10m, a thinner optical element storage package can be provided.

Moreover, to bond the light transmissive substrates 21 and 22 to the lid 10m, each of the light transmissive substrates 21 and 22 only needs to be fit into a recess (region 10mc) where the lid 10m is thinner than the other portions thereof, whereby the positional alignment is readily made.

Third Embodiment

An optical module and an electronic apparatus according to a third embodiment will next be described. In the description, the same components as those in the embodiments described above have the same reference characters, and no redundant description will be made.

In the third embodiment, a description will be made of a colorimetric sensor 1000 as an optical module into which the optical filter device 200 is incorporated and a colorimetric apparatus 2000 as an electronic apparatus into which the optical filter device 200 is incorporated.

Figure 4:
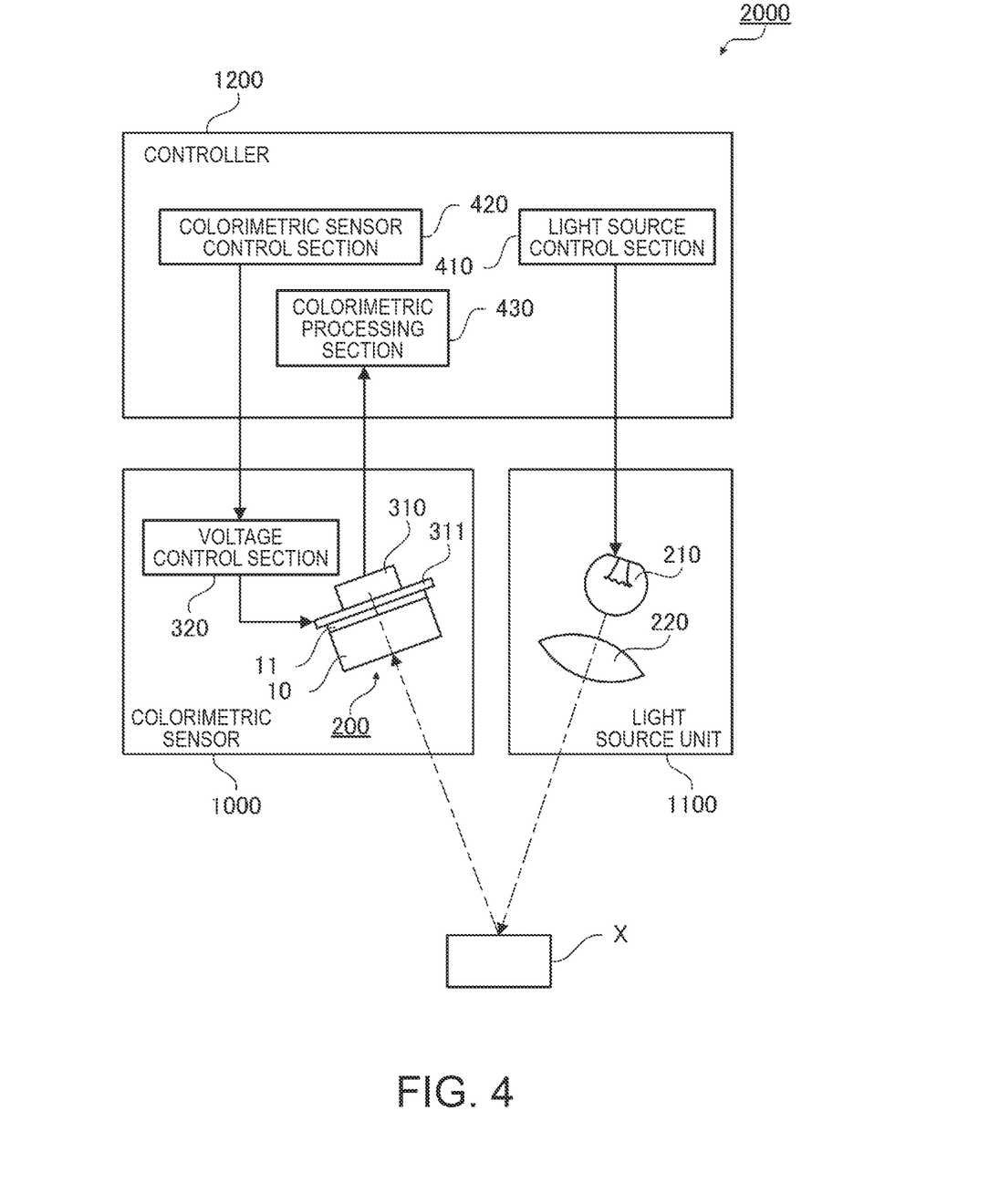
FIG. 4 is a block diagram showing a schematic configuration of a colorimetric apparatus.

FIG. 4 is a block diagram showing a schematic configuration of the colorimetric apparatus 2000.

The colorimetric apparatus 2000 includes a light source unit 1100, which outputs light toward an object to be examined X, the colorimetric sensor 1000, and a controller 1200, which controls the overall action of the colorimetric apparatus 2000, as shown in FIG. 4. In the colorimetric apparatus 2000, the object being examined X reflects the light outputted from the light source unit 1100, the colorimetric sensor 1000 receives the reflected light, which is light being examined, and a detection signal outputted from the colorimetric sensor 1000 is analyzed to determine the chromaticity of the light being examined, that is, the color of the object being examined X.

The light source unit 1100 includes a light source 210 and a plurality of lenses 220 (FIG. 4 shows only one of them) and outputs white light toward the object to be examined X. The plurality of lenses 220 may include a collimator lens. In this case, in the light source unit 1100, the collimator lens parallelizes the white light emitted from the light source 210, and a projection lens (not shown) outputs the parallelized light toward the object to be examined X. In this embodiment, the colorimetric apparatus 2000 including the light source unit 1100 is presented by way of example, but the light source unit 1100 may be omitted, for example, when the object to be examined X is a light emitting member, such as a liquid crystal panel.

The colorimetric sensor 1000 includes the optical filter device 200. The colorimetric sensor 1000 further includes a detector 310, which receives light having passed through the etalon 1 in the optical filter device 200, and a voltage control section 320, which varies the wavelength of the light that the etalon 1 transmits, as well as the optical filter device 200, as shown in FIG. 4.

The colorimetric sensor 1000 further includes a light-incident-side optical lens (not shown) that is disposed in a position facing the etalon 1 and introduces the light reflected off the object being examined X (light being examined) into the optical filter device 200. In the thus configured colorimetric sensor 1000, the etalon 1 in the optical filter device 200 separates light of a predetermined wavelength from the light being examined incident through the light-incident-side optical lens, and the detector 310 receives the separated light.

The detector 310 is formed of a plurality of opto-electrical conversion elements and produces an electric signal according to the amount of received light. The detector 310 is connected to the controller 1200, for example, via a circuit board 311 and outputs the produced electric signal as a light reception signal to the controller 1200.

Further, the external connection terminal 16 (see FIG. 1A), which is formed on the outer wall surface 11a (see FIG. 1A) of the base substrate 11, is connected to the circuit board 311 and further connected to the voltage control section 320 via a circuit formed in the circuit board 311.

In the configuration described above, the optical filter device 200 and the detector 310 can be integrated with each other via the circuit board 311, whereby the configuration of the colorimetric sensor 1000 can be simplified.

The voltage control section 320 is connected to the external connection terminal 16 of the optical filter device 200 via the circuit board 311. The voltage control section 320 can set a predetermined wavelength to be separated by applying a predetermined step voltage to the etalon 1 based on a control signal inputted from the controller 1200.

The controller 1200 controls the overall action of the colorimetric apparatus 2000.

The controller 1200 can, for example, be a general-purpose personal computer, a personal digital assistant, or a computer dedicated for colorimetry.

The controller 1200 includes a light source control section 410, a colorimetric sensor control section 420, and a colorimetric processing section 430, as shown in FIG. 4.

The light source control section 410 is connected to the light source unit 1100 and outputs a predetermined control signal to the light source unit 1100 based, for example, on a setting input from a user to instruct the light source unit 1100 to output white light of predetermined luminance.

The colorimetric sensor control section 420 is connected to the colorimetric sensor 1000, sets the wavelength of light to be received by the colorimetric sensor 1000 based, for example, on a setting input from the user, and outputs a control signal that instructs detection of the amount of received light of the wavelength to the colorimetric sensor 1000. The voltage control section 320 in the colorimetric sensor 1000 then sets a voltage applied to the etalon 1, based on the control signal, in such a way that the etalon 1 transmits only light of the wavelength desired by the user.

The colorimetric processing section 430 analyzes the amount of received light detected by the detector 310 to determine the chromaticity of the object being examined X.

As described above, the colorimetric sensor 1000 as the optical module and the colorimetric apparatus 2000 as the electronic apparatus according to this embodiment can provide the following advantageous effects.

The colorimetric apparatus 2000 according to this embodiment includes the optical filter device 200. Since the cavity 12 (see FIG. 1A) of the optical filter device 200 is highly airtight and prevents foreign matter, such as water particles, from entering, no foreign matter can change the optical characteristics of the etalon 1. The colorimetric sensor 1000 can therefore be also so configured that the detector 310 can detect light of a target wavelength extracted at high resolution and an accurate amount of light of the desired target wavelength can be detected. The colorimetric apparatus 2000 can therefore perform accurate colorimetry on the object being examined X.

Further, the detector 310 is disposed in a position facing the base substrate 11, and the detector 310 and the external connection terminal 16 provided on the outer wall surface 11a of the base substrate 11 are connected to the single circuit board 311. That is, since the base substrate 11 of the optical filter device 200 is disposed on the light exiting side thereof, the base substrate 11 can be disposed in a position in the vicinity of the detector 310, which detects the light outputted from the optical filter device 200. Wiring the components described above via the single circuit board 311 as described above can therefore simplify the wiring structure and reduce the number of boards.

Further, the voltage control section 320 may be disposed on the circuit board 311. In this case, the configuration can be further simplified.

The invention is not limited to the embodiments described above, and a variety of changes and modifications can be made to the embodiments described above. Variations will be described below. In the following description, the same components as those in the embodiments described above have the same reference characters, and no redundant description will be made.

First Variation

FIGS. 5A to 5D are cross-sectional views showing optical element storage packages 102 to 105 according to a first variation. In FIGS. 5A to 5D, no optical element is shown.

The first embodiment has been described with reference to the case where the window members (light transmissive substrates 21 and 22) are so bonded to the lid 10 that they sandwich the front and rear sides of the opening 41 formed through the lid 10 as shown in FIG. 1A, but the configuration described above is not necessarily employed. That is, the characteristic configuration according to the embodiments of the invention in which window members are so bonded that they sandwich the front and rear sides of an opening is not necessarily applied to a lid portion because the configuration is advantageous when the material of a portion through which the opening is formed and the material of the window members significantly differ from each other in terms of coefficient of thermal expansion.

Figure 5A:
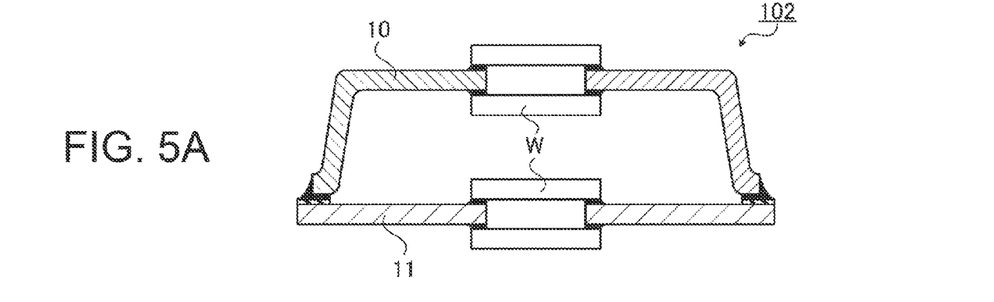
FIGS. 5A to 5D are cross-sectional views showing optical element storage packages according to a first variation.

The optical element storage package 102 shown in FIG. 5A is an example that employs a configuration in which window members W sandwich the front and rear sides of both the openings of the lid 10 and the base substrate 11. The optical element storage package 102 is advantageous when the lid 10 and the window members W differ from each other and the base substrate 11 and the window members W differ from each other significantly in terms of coefficient of thermal expansion.

Figure 5B:
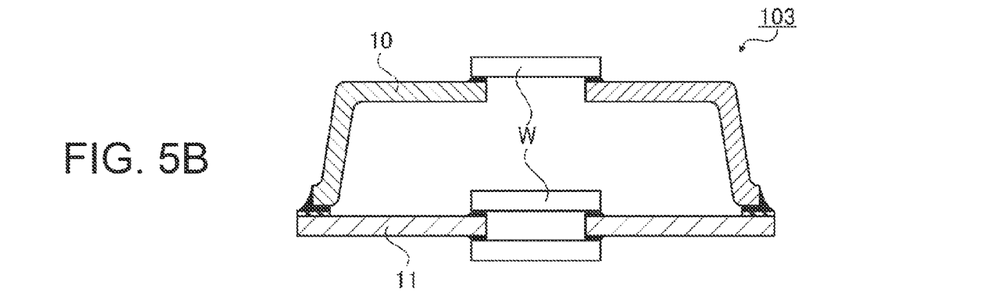

The optical element storage package 103 shown in FIG. 5B is an example that employs a configuration in which the window members W sandwich the front and rear sides of the opening of the base substrate 11. The optical element storage package 103 is advantageous when the base substrate 11 and the window members W significantly differ from each other in terms of coefficient of thermal expansion.

Figure 5C:
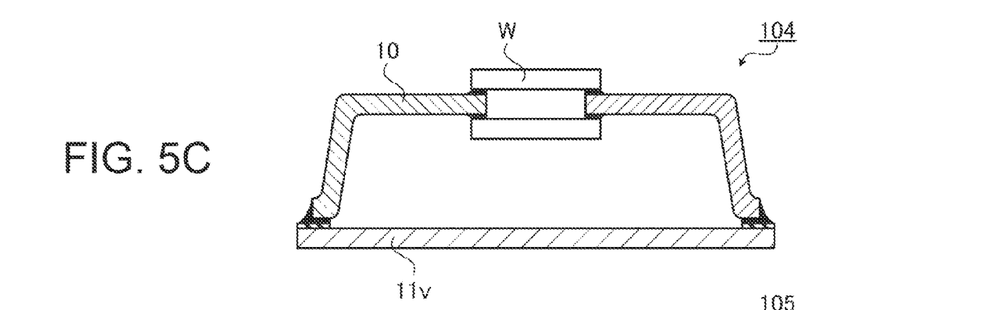

The optical element storage package 104 shown in FIG. 5C is an example in a case where the base substrate 11 has no opening (base substrate 11*v*). For example, when the optical element is, for example, an optical sensor or an imaging device, the lid 10 or the base substrate 11 only needs to have an opening in many cases. Even when the package does not transmit light as described above but when the lid 10 and the window members W significantly differ from each other in terms of coefficient of thermal expansion, employing the configuration in which the window members W sandwich the front and rear sides of the opening of the lid 10 provides the same advantageous effects described above.

Figure 5D:
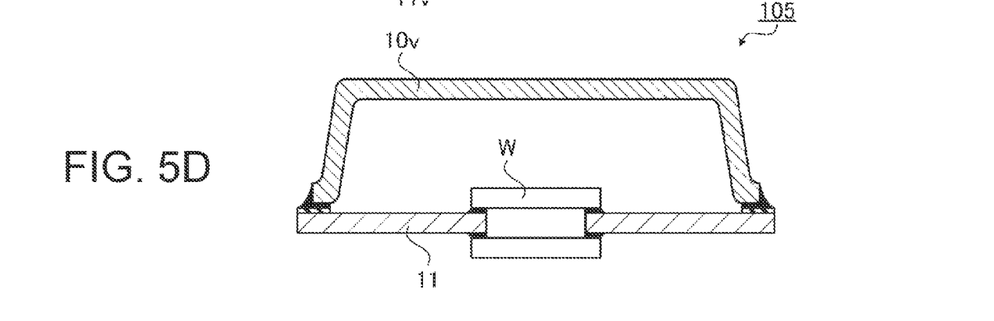

The optical element storage package 105 shown in FIG. 5D is an example in a case where the lid 10 has no opening (lid 10*v*). Even when the package does not transmit light as described above but when the base substrate 11 and the window members W significantly differ from each other in terms of coefficient of thermal expansion, employing the configuration in which the window members W sandwich the front and rear sides of the opening of the base substrate 11 provides the same advantageous effects described above.

Second Variation

Figure 6A:
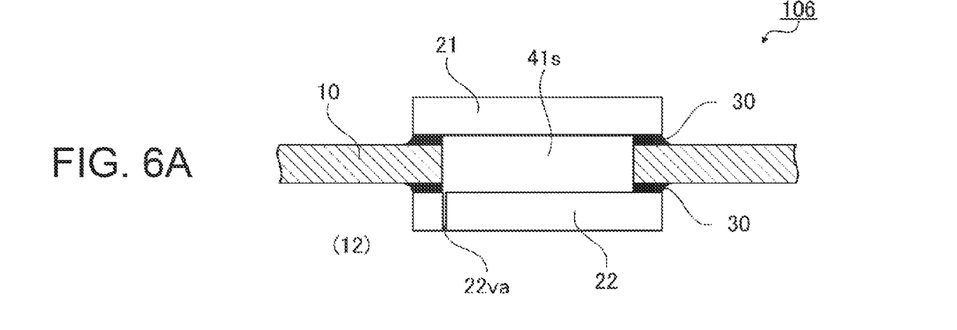
FIG. 6A is a cross-sectional view showing an opening formed through a top surface portion of an optical element storage package according to a second variation and portions around the opening.

FIG. 6A is a cross-sectional view showing an opening formed through a top surface portion of an optical element storage package 106 according to a second variation and portions around the opening.

In the first embodiment, the bonding member 30 that bonds the lid 10 and the light transmissive substrate 22 is provided with the gaps 30*s*, which allow the space 41*s* and the cavity 12 to communicate with each other as shown in FIGS. 1A and 1C, but the method for allowing the space 41*s* and the cavity 12 to communicate with each other is not limited to the method described above. For example, a communication hole 22*va* may be provided through the light transmissive substrate 22, as shown in FIG. 6A.

According to this variation, since the bonding member 30 can be seamlessly disposed, the light transmissive substrate 22 and the lid 10 can be intimately fixed to each other without any decrease in bonding strength therebetween. As a result, thermal stress on the front side of the lid 10 and thermal stress on the rear side thereof are balanced well, whereby an optical element storage package that is less deformable and hence has satisfactorily maintained airtightness can be provided.

Third Variation

An optical element storage package according to a third variation (not shown) is the same as the optical element storage package according to the first embodiment except that it has no communication hole that allows the space 41*s* and the cavity 12 to communicate with each other.

In the first embodiment and the second variation, the space 41*s* and the cavity 12 are allowed to communicate with each other as shown in FIGS. 1A, 1C, and 6A so that separation of the light transmissive substrate 22 is unlikely even when the pressure in the cavity 12 is lowered. The space 41*s* and the cavity 12 are, however, not necessarily allowed to communicate with each other.

Now, let P1 be the atmospheric pressure, P2 be the pressure in the cavity 12, and P3 be the pressure in the space 41*s*. The same advantageous effects described above can be provided when the pressure in the space 41*s* is lowered and the space 41*s* is sealed in an airtight manner in such a way that P1>P2>P3 is satisfied. That is, since the pressure P2 in the cavity 12 is higher than the pressure P3 in the space 41*s*, the pressure difference prevents a force from acting in the direction in which the light transmissive substrate 22 is separated. As a result, an optical element storage package capable of more satisfactorily maintaining internal airtightness can be provided.

It is noted that in the step of bonding the light transmissive substrates 21 and 22 to the lid 10, the airtight sealing needs to be so performed that the pressure P3 in the space 41*s* is lower than the pressure P2 in the cavity 12.

Fourth Variation

Figure 6B:
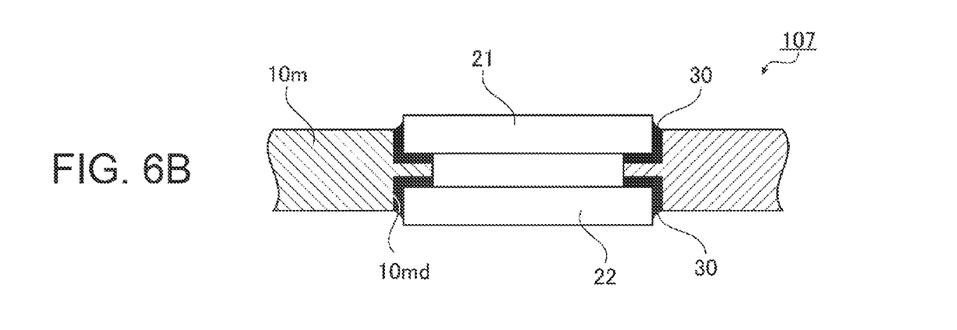
FIG. 6B is a cross-sectional view showing an opening formed through a top surface portion of an optical element storage package according to a fourth variation and portions around the opening.

FIG. 6B is a cross-sectional view showing an opening formed through a top surface portion of an optical element storage package 107 according to a fourth variation and portions around the opening.

In the second embodiment, the lid 10*m* has the thin region 10*mc* including the portion to which the light transmissive substrate 21 and the light transmissive substrate 22 are bonded, and the light transmissive substrate 21 and the light transmissive substrate 22 are bonded to the surface 10*ma* and the surface 10*mb* respectively, as shown in FIG. 3.

In contrast, in the optical element storage package 107, side surfaces 10*md* formed when a thin portion of the lid 10*m* is formed are also used as bonding surfaces, and the light transmissive substrates 21 and 22 are bonded also to the respective side surfaces 10*md* via the bonding members 30.

In the configuration described above, when the coefficient of thermal expansion of the lid 10*m* is, for example, smaller than the coefficient of thermal expansion of the window members (light transmissive substrate 21 and light transmissive substrate 22) and when the package is used in a temperature environment in which the temperature is equal to or below the lowest temperature in an expected environment in which the package is used, the configuration in which the side surfaces of the window members and the side surfaces 10*md* of the lid 10*m* are in contact with each other via the bonding members 30 as shown in FIG. 6B allows thermal stress in the environment in which the package is used to act as compressive stress on the side surfaces of the window members. In general, since breakage of a bonding surface due to compressive stress is more unlikely than the breakage due to shear stress, the configuration of this variation increases the strength of the package against thermal stress. As a result, an optical element storage package capable of more satisfactorily maintaining internal airtightness can be provided.

Fifth Variation

Figure 6C:
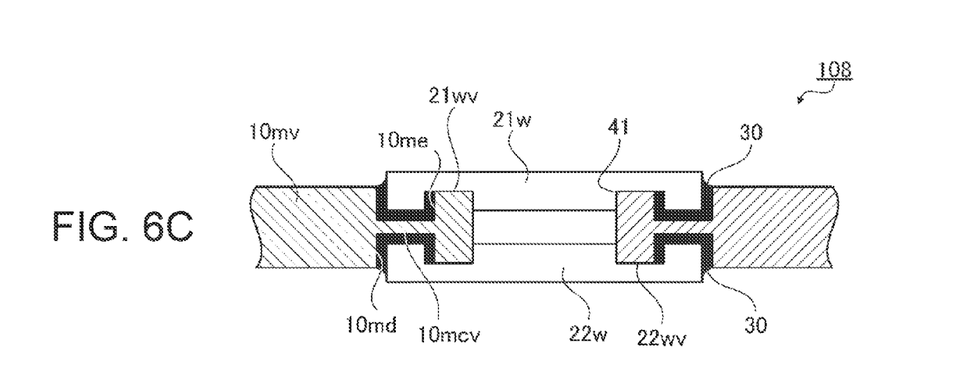
FIG. 6C is a cross-sectional view showing an opening formed through a top surface portion of an optical element storage package according to a fifth variation and portions around the opening.

FIG. 6C is a cross-sectional view showing an opening formed through a top surface portion of an optical element storage package 108 according to a fifth variation and portions around the opening.

In the fourth variation, the bonding strength is increased because the side surfaces 10*md* facing inward toward the opening formed through the top surface portion are also used as bonding surfaces. In contrast, in the optical element storage package 108, surfaces facing the side surfaces 10*md* are also used as bonding surfaces.

The optical element storage package 108 is formed, for example, of a lid 10*mv*, the base substrate 11, a light transmissive substrate 21*w* bonded to the lid 10*mv*, a light transmissive substrate 22*w* bonded to the lid 10*mv*, the light transmissive substrate 23 bonded to the base substrate 11, the bonding members 13 and 30, and the bonding pattern 15 (see FIG. 1A for base substrate 11, light transmissive substrate 23, bonding member 13, and bonding pattern 15).

The lid 10*mv* has a groove portion 10*mcv* located in in the opening 41 and having grooves on the front and rear sides, and the light transmissive substrates 21*w* and 22*w* have grooves 21*wv* and 22*wv* respectively, which fit into the groove portion 10*mcv*, as shown in FIG. 6C.

In the fourth variation, in a manufacturing method expected to provide the advantageous effects, it is desirable to consider not only the relationship between the coefficients of thermal expansion but also the relationship between the temperature at the time of bonding and the temperature in an expected environment in which the package is used. In contrast, the configuration of the optical element storage package 108 according to this variation allows both the side surfaces 10*md* and 10*me* of the groove portion 10*mcv* to receive thermal stress in the form of compressive stress, whereby it is not necessary to consider the direction of thermal stress. Further, the grooves 21*wv* and 22*wv* that fit into the groove portion 10*mcv* increase the bonding strength.

As a result, an optical element storage package capable of more satisfactorily maintaining internal airtightness can be provided.

The entire disclosure of Japanese Patent Application No. 2012-229588 filed on Oct. 17, 2012 is expressly incorporated by reference herein.

What is claimed is:

1. An optical element storage package comprising:
   a case member that accommodates an etalon in an inner space thereof, the case member including:
   a base substrate having first and second surfaces, a bonding member being provided on the first surface, an external connection terminal being provided on the second surface, the etalon being provided on the first surface via the bonding member; and
   an enclosure member that has third and fourth surfaces, the enclosure member being provided on the base substrate to form the inner space, the etalon being disposed in the inner space, the enclosure member having an opening through which light can pass;
   a first window member that is bonded to the third surface of the enclosure member in a position outside the case member and covers the opening; and
   a second window member that is bonded to the fourth surface of the enclosure member in a position inside the case member and covers the opening.

2. The optical element storage package according to claim 1,
   wherein T1>T2 is satisfied,
   where T1 is an average thickness of the enclosure member, and T2 is the distance between part of the third surface where the enclosure member and the first window member are bonded to each other and part of the fourth surface where the enclosure member and the second window member are bonded to each other.

3. An optical filter device comprising:
   an optical filter accommodated in the optical element storage package according to claim 2.

4. An optical module comprising:
   the etalon accommodated in the optical element storage package according to claim 2.

5. An electronic apparatus comprising the etalon accommodated in the optical element storage package according to claim 2.

6. The optical element storage package according to claim 1,
   wherein the second window member is made of a material of which the first window member is made.

7. An optical filter device comprising:
   an optical filter accommodated in the optical element storage package according to claim 6.

8. An optical module comprising:
   the etalon accommodated in the optical element storage package according to claim 6.

9. An electronic apparatus comprising the etalon accommodated in the optical element storage package according to claim 6.

10. The optical element storage package according to claim 1,
    wherein the etalon is sealed by the case member and the first window member in an airtight manner, and
    P1>P2 is satisfied,
    where P1 is the atmospheric pressure, and P2 is the pressure in the case member.

11. The optical element storage package according to claim 10,
    wherein an air compartment formed by the enclosure member and the first and second window members bonded to the enclosure member is sealed in an airtight manner, and
    P2>P3 or P2=P3 is satisfied,
    where P3 is the pressure in the air compartment.

12. The optical element storage package according to claim 10,
    wherein the second window member includes a communication hole that allows an air compartment formed by the enclosure member and the first and second window members bonded to the enclosure member to communicate with the interior of the case member.

13. An optical filter device comprising:
    an optical filter accommodated in the optical element storage package according to claim 10.

14. An optical module comprising:
    the etalon accommodated in the optical element storage package according to claim 10.

15. An electronic apparatus comprising the etalon accommodated in the optical element storage package according to claim 10.

16. The optical element storage package according to claim 1,
    wherein the enclosure member is made of a metal material, and each of the first window member and the second window member is made of a light transmissive material.

17. An optical filter device comprising:
    an optical filter accommodated in the optical element storage package according to claim 1.

18. An optical module comprising:
    the etalon accommodated in the optical element storage package according to claim 1.

19. An electronic apparatus comprising the etalon accommodated in the optical element storage package according to claim 1.

* * * * *